United States Patent
Alhems et al.

(10) Patent No.: US 11,572,683 B2
(45) Date of Patent: Feb. 7, 2023

(54) CONCRETE WALL PANELS WITH FLEXIBLE INSULATION MATERIAL

(71) Applicant: KING FAHD UNIVERSITY OF PETROLEUM AND MINERALS, Dhahran (SA)

(72) Inventors: Luai M. Alhems, Dhahran (SA); Mohammed Ibrahim, Dhahran (SA); Aftab Ahmad, Dhahran (SA); Mohammed Salihu Barry, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 16/523,173

(22) Filed: Jul. 26, 2019

(65) Prior Publication Data

US 2021/0025158 A1 Jan. 28, 2021

(51) Int. Cl.
*E04B 1/14* (2006.01)
*E04B 1/32* (2006.01)
*B32B 13/04* (2006.01)

(52) U.S. Cl.
CPC .............. *E04B 1/14* (2013.01); *B32B 13/045* (2013.01); *E04B 1/3205* (2013.01);
(Continued)

(58) Field of Classification Search
CPC ........ E04B 1/14; E04B 1/3205; E04B 1/3211; E04B 2001/3258; B32B 13/045;
(Continued)

(56) References Cited

U.S. PATENT DOCUMENTS

| 6,351,918 B1 | 3/2002 | Westra et al. |
| 6,753,061 B1 | 6/2004 | Wedi |

(Continued)

FOREIGN PATENT DOCUMENTS

| CN | 2644563 Y | 9/2004 |
| CN | 101363250 A | 2/2019 |
| EP | 1 626 133 B1 | 8/2006 |

OTHER PUBLICATIONS

Boeingconsult.com, "General thermal requirements," Jul. 14, 2017, obtained from https://web.archive.org/web/20170714003219/https://www.boeingconsult.com/Environment/thermal-calculations-a.html (Year: 2017).*

(Continued)

*Primary Examiner* — Brian Handville
(74) *Attorney, Agent, or Firm* — Oblon, McClelland, Maier & Neustadt, L.L.P.

(57) ABSTRACT

A structural, load-bearing panel useful in constructing multistory buildings may have a panel height, panel width, and panel thickness, and may include a first layer comprising at least 75 wt. % of concrete, relative to a total weight of the first layer; an insulation layer comprising flexible polymer, the insulation layer having a thickness of at least 5 cm; and a second layer comprising at least 75 wt. % concrete, wherein the insulation layer is sandwiched between the first and second layers, and wherein the panel is suitable to be set in any of a planar, curved, and polyhedral cross-sectional shape. Set panels are not flexible, though the flexibility of the insulation layer, particularly of a polyethylene foam, may allow the panel to have a curved, or polyhedral cross-section while still serving as a structural support.

15 Claims, 6 Drawing Sheets

(52) U.S. Cl.
CPC ......... *E04B 1/3211* (2013.01); *B32B 2607/00* (2013.01); *E04B 2001/3258* (2013.01)

(58) Field of Classification Search
CPC ............ B32B 2607/00; B32B 2250/03; B32B 2266/0207; B32B 2266/025; B32B 5/18; B32B 2250/40; B32B 2266/0221; B32B 2266/0278; B32B 2307/304; B32B 2307/546; B32B 2307/732; B32B 3/08; E04C 2/328; E04C 2/288

See application file for complete search history.

(56) References Cited

U.S. PATENT DOCUMENTS

| | | | |
|---|---|---|---|
| 2011/0305868 A1* | 12/2011 | Heytens | E04B 1/803 428/116 |
| 2017/0321438 A1* | 11/2017 | South, Jr. | E04B 1/169 |
| 2018/0155246 A1* | 6/2018 | Prante | B32B 13/02 |
| 2018/0222798 A1 | 8/2018 | Ibrahim et al. | |
| 2020/0307151 A1* | 10/2020 | Ben-Daat | B32B 21/02 |

OTHER PUBLICATIONS

Homeli.co.uk, "5 Examples of Living Green Roofs—Grass Turf and Succulent Sedums," obtained from https://web.archive.org/web/20180707065526/http://homeli.co.uk/5-examples-of-living-green-roofs-grass-turf-and-succulent-sedums/ (Year: 2018).*

Sani Mohammed Bida, et al., "Thermal performance of super-insulated precast concrete structural sandwich panels", Energy and Buildings, vol. 176, Oct. 2018, pp. 418-430 (Abstract only).

Lei Fu, et al., "Research on Energy Saving Method of Traditional House in Northwest Shanxi", Advanced Materials Research (/AMR), vol. 689, May 2013, pp. 39-43 (Abstract only).

* cited by examiner

CONCRETE WALL PANELS WITH FLEXIBLE INSULATION MATERIAL

BACKGROUND OF THE INVENTION

Field of the Invention

The present disclosure relates to cement panels comprising a flexible polymer layer as an inner layer and generally suitable as a load-bearing element in buildings, particularly cement slabs sandwiching polyolefin foams preferably having rebar posts within the panels oriented orthogonal to the outer planes of the panels, which panels can be set in curved, geometric, or irregular cross-sectional configurations, as well as methods of making and using such panels.

Description of the Related Art

Growing demand and costs of energy worldwide along with increasingly stringent regulations that have been imposed by local, national, regional, and global governing bodies to limit the greenhouse gases have caused energy conservation to become a priority throughout the world. It is estimated that about 77.7% of electrical energy produced is utilized to power buildings. To reduce building energy usage, research into building materials has focused on developing new materials and systems.

As punitive measures are beginning to be enforced globally to reduce greenhouse gas emissions, building material research is being focused on developing thermally efficient building materials and systems of reducing energy consumption. With the increasing cost of energy globally, energy conservation is also becoming a priority, particularly in the developing world. An important aspect of conserving energy in building systems involves selecting energy efficient and cost effective materials. In hot and arid regions about 73% of the total building energy is consumed for air-conditioning As global energy consumption is expected to rise steadily in the future, the development of energy efficient systems and building materials is becoming vital. Exterior building walls, through which heat is transmitted, are the key components of the building construction in determining the energy efficiency of structural systems. Thus, the development of energy efficient exterior walls is essential for energy conservation.

Building materials have recently been developed with a view to curbing building energy requirements, including structural lightweight concrete and autoclave aerated concrete (AAC). Both structural lightweight concrete and AAC proposed have shortcomings. Among recently developed building systems, sandwich concrete wall panels having an extruded polystyrene (XPS) board as a section of the wall panel have been extensively used. There are disadvantages to using systems like XPS concrete wall panels. One disadvantage is that the XPS board is extremely brittle, complicating its placement in the formwork while the panel is being, fabricated, apart from the cost of XPS.

Lightweight concrete and AAC suffer from the side-effect that the strength of concrete decreases as the unit weight decreases. Moreover, lightweight concrete suffers from durability concerns. Among building systems, XPS sandwiched structural panels suffer not only from the high brittleness of XPS boards, but also from difficulty during installation due to reinforcing steel in walls, as well as building utilities such as plumbing and electrical components. Poor workmanship can introduce thermal bridges where utilities are present and consequently reduce thermal insulating properties.

Due to multiple factors including the depletion of fossil fuels, energy consumption and/or flaws of conventional structural systems, the threat of global warming, new innovative flexible insulation materials have been sought.

U.S. Pat. No. 6,753,061 to Wedi (Wedi) discloses a flexible sandwich panel having a center layer and one or two outer layers, where the center layer is made of a polymeric synthetic material, is flexible and exhibits a coarse-cell honeycomb structure with open cells in the direction of the upper and lower side of the center layer. Wedi's outer layer or layers consist of a hardened mortar that is made flexible with synthetic additives, and that have as their core a web material consisting essentially of fibers, where the exterior side of the hardened outer layer is left unrefined or roughcast in a plaster-like manner, Wedi's sandwich panel can he bent without flaking of the outer layers. Wedi requires a honeycomb polymeric material and uses of a flexible mortar, loaded with elasticizer, to provide an overall flexible panel with a compressive strength around 10 N/cm$^2$, unsuitable as a building support.

U.S. Pat. No. 6,351,918 to Westra et al. (Westra) discloses a system for securing an insulation layer in place between two spaced apart wall forms while concrete is poured on both sides of the insulation layer. Westra secures a polymer insulating layer to a form with wedges made of plastic, such as PP or PE, before pouring in a direction parallel to the plane of the insulating layer, thereby preventing the insulating layer from rising due to the weight of the concrete. Westra does not indicate the material of its insulating layer, i.e., not even whether it is plastic or fiberglass, nor that its insulating layer is flexible, but only that the wedges and connectors securing the insulating layer are flexible plastic.

CN 101363250 A by Yu (Vu) discloses a large-space in situ-cast floor cover plate construction method involving replacing a paper, hard plastic, or thin-walled corrugated tube regularly used in a hollow floor with a soft aerated plastic component. Yu turns all the iron wires for throwing and binding outwards to ensure that the soft aerated plastic component is not pricked. Yu's soft aerated plastic component can be rolled into coils like a plastic membrane. In large-span and large-space buildings and reconstruction projects, Yu's floor cover plate has good thermal insulation performance, low material cost, no steel bar corrosion, light weight, and anti-vibration properties. Yu does not, teach concrete layers sandwiching a flexible plastic insulation layer in a (vertical) structural panel, nor rebar connectors that penetrate the PE insulation and concrete layers orthogonally to the plane of such of a panel.

EP 1 626 133 B1 to Jakobs (Jakobs) discloses a multilayer insulator comprising two aluminum foils on its outer faces and at least three insulating layers including at least an air bubble film and at least one plastic foam, the insulator comprising at least two additional "inner" aluminum foils separating one or several insulating layers, which layers are homogeneously welded or glued over their entire surface. Jakobs aims to provide a multilayer insulation combining both the benefits of PE foam and air bubble film on acoustics and thermal insulation with the use of at least four Al films representative both a multiple barrier to infrared radiation, water vapor, and fire. Jakobs does not describe structural concrete elements, but rather thin multilayer type insulation mainly used in thermal or acoustic insulation under floating screed or under parquet.

CN 2644563 Y by Liu (Liu) discloses a foam board inlayed insulating brick for heat preservation and insulation of a building roof. Liu has a concave brick and a foam board inlayed inside the brick, Liu's brick is a preform cement concrete, a colored glaze brick formed by sintering ceramic, or a wear-resistant brick. Liu's foam board is a polystyrene expanded plastic board, which is connected with the building roof, wherein no overhead position is left. Lie's brick body can be 10 to 60 mm thick and the insulation 10 to 40 mm thick. Liu does not disclose polyolefin, e.g., PE or PP, insulation nor does Liu disclose a structural (load bearing) element. Liu's brick appears to be suitable only for partition walls.

Energy & Buildings 2018, 176(1), 418-430 by Bida et al. (Bida), now retracted, discloses precast concrete sandwich panels (PCSP) to improve the thermal performance of solid concrete panels by sandwiching an insulation layer between the concrete layers or wythes. Bida's two concrete layers are connected through the insulation using C-shape shear connectors making these concrete wythes act as one panel and allow it to be a load-bearing sandwich panel to carry lateral force. Bida reports three-layer PCSPs to be un-economical and, to require increased production time, while alternative approaches such as the use of fiber reinforced polymer (FRP) for shear connection leads to a reduction in structural performance. Bida's concrete layers are produced in split units and assembled together with the insulation layers. Bida reports a thermal resistance of 0.7 to 2.35 $m^2K/W$, transmittance of 0.06 to 0.21 W/mK, and conductivity of 0.43 to 1.43 $W/m^2K$ for the panels. Bida reports that the most staggered panel (400 mm) achieved the highest thermal resistance compared to others. Bida requires C-shape shear connectors and fails to specify a polyethylene plastic insulation.

Adv. Mater. Res. 2013, 689, 39-443 by Fu et al. (Fu) discloses improving insulation in traditional dwellings in Shanxi province having a poor insulation performance. Fu uses cement expanded perlite mortar and polyethylene plastic foam board as thermal insulation materials to transform outer walls. Fu does not disclose load-bearing panels, nor using cement panels.

In light of the above, a need remains for load-bearing wall panels, particularly for wall panels comprising cement layers sandwiching a flexible polymer layer, such as a polyolefin foam layer, that is more flexible than PS or XPS/EPS, especially panels which can be fixed into curved, angled, and/or irregular cross-sectional geometries, and methods of making and using such panels.

SUMMARY OF THE INVENTION

Aspects of the invention provide panels having a panel height, panel width, and panel thickness, whereby the panels may comprise: a first layer comprising at least 40 wt. % of concrete, relative to a total weight of the first layer; an insulation layer comprising flexible polymer, the insulation layer having a thickness of at least 5 cm; and a second layer comprising at least 40 wt. % concrete, wherein the insulation layer is sandwiched between the first and second layers, wherein the panel is suitable as a load-bearing element, and wherein the panel is suitable to be set in any of a planar, curved, and polyhedral cross-sectional shape. Inventive panels may be modified by any permutation of the features described herein, particularly the following.

The insulation layer may comprise a polymer foam as the flexible polymer, such as a polyolefin, nitrile rubber, polyester, polyurethane (PU), poly ethylene-vinyl alcohol (PEVA), poly ethylene-vinyl acetate, and/or polyvinyl alcohol foam, especially a polyethylene-comprising foam as the flexible polymer. The (polyolefin comprising) insulation layer may comprise a LDPE, HDPE, LLDPE, VLDPE, metallocene-catalyzed polyethylene, a polypropylene (PP), a PE-co-PP, and/or expanded PP foam as the flexible polymer. The flexible polymer may be present in an amount of at least 90 wt. % of the insulation layer Inventive panels may further comprise a metal bar configured to extend between the first and second layer, through the insulating layer, in an orientation substantially orthogonal to a surface defined by the panel height and the panel width. The metal bar may comprise steel, and may be rebar. The panel may comprise one of the metal bar per every 150 to 400 $cm^2$. Inventive panels may comprise no further metal bars traversing the insulating layer.

The concrete in the first and/or second concrete layers may be Portland cement.

The panel height may be at least 35 cm, the panel width may be at least 20 cm, and/or the panel thickness may be at least 10 cm. The insulation layer may have a thickness in a range of from 10 to 50 mm, and the first and second layers may independently have a thickness in a range of from 50 to 100 mm. Inventive panels may comprise no further layers than the insulation layer, the first layer, and the second. The insulation layer may directly contact the first and second layers.

Inventive panels may having a cross-section orthogonal to its height axis including a curve and/or an angle of at least 15°. Inventive panels may be configured as a pipe or a half-pipe with an inner diameter in a range of from 25 to 200 cm.

Aspects of the invention include methods of making a load-bearing building panel, which methods may comprise: pouring a first concrete layer in a frame in a plane parallel to the ground; providing a flexible polymer foam layer onto the first concrete layer in a plane parallel to the ground; penetrating the flexible polymer foam layer with one metal bar per 100 to 300 $cm^2$ orthogonally to the plane parallel to the ground, the bar extending into the first concrete layer and protruding vertically beyond the flexible polymer foam layer; and/or pouring a second concrete layer in a frame in a plane parallel to the ground.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
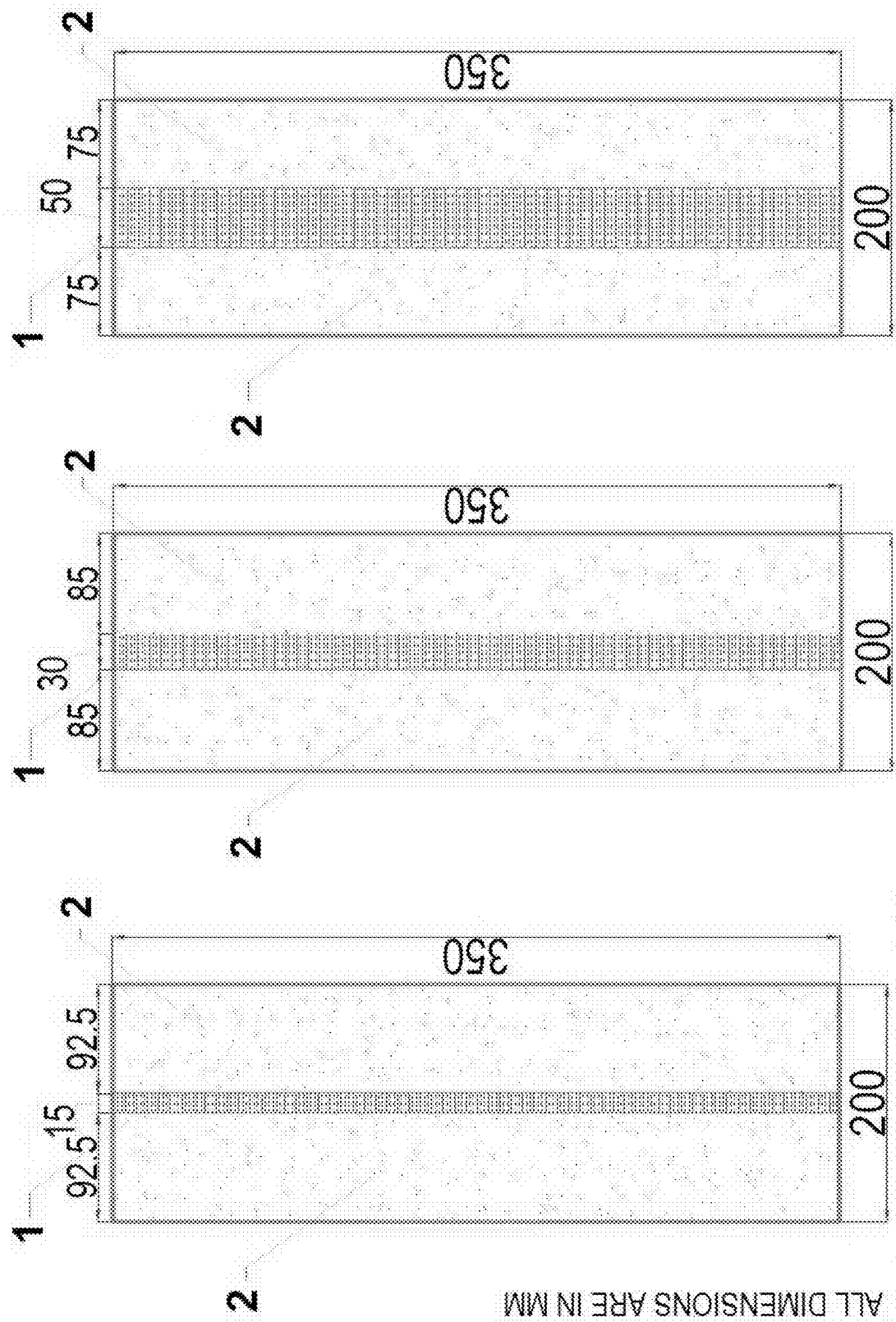
FIG. 1 shows a cross-sectional view of the three exemplary sandwiched panels.

Aspects of the invention provide panels which may comprise: a first layer comprising at least 40, 50, 60, 70, 75, 80, 85, 90, 91, 92, 92.5. 93, 94, 95, 96, 97, 97.5, 98, or 99 wt. % of concrete, preferably comprising Portland cement (cured), though any concrete or formulation thereof described herein, relative to a total weight of the first layer; an insulation layer comprising flexible polymer, the insulation layer having a thickness of at least 5 cm; and a second layer (independently) comprising at least 40, 50, 60, 70, 75, 80, 85, 90, 91, 92, 92.5, 93, 94, 95, 96, 97, 97.5, 98, or 99 wt. % concrete, wherein the insulation layer is sandwiched between the first and second layers, wherein the panel is suitable as a load-bearing element, and wherein the panel is suitable to be set in any of a planar, curved, and polyhedral cross-sectional shape.

The concrete in the first and/or second concrete layers may comprise, for example, Portland cement.

Inventive panels are thus generally capable of carrying the, load of multi-story (cement, brick, or otherwise) buildings, though the panels are not limited to use in load-bearing, and may also be used as separation and/or decorative walls and/or as walls of common infrastructure, such as in sewer works, heat transport (e.g., so-called "Fernwärme" systems, or communal piped heating systems from at least one centralized heat source), oil or other fluid transport, etc.—as protective shells in some cases or as primary carriers. Although the panels may be planar or even primarily planar, a considerable advantage of their design is that the flexible insulation layer(s) allow for the construction of curved, angled, and/or irregular cross-sectional shapes that standard XPS systems cannot accommodate. The insulation layer, as described herein, is typically an integral, non-fractured (uncut), contiguous layer or sheet, and must not be fractured in order to achieve the bends and curves into which the end panels can be rigidly set. Given the suitability of the panels for setting with 3D non-planarity, e.g., curvature, inventive panels may be useful as acoustic damping construction elements, for example, in an underground or above ground train tunnel, along highways in congested or otherwise resided areas, near or at airports, as well as surrounding equipment and infrastructure sensitive to such acoustic waves, even if such equipment or infrastructure itself does not create noise.

The insulation layer may comprise a polymer foam as the flexible polymer, particularly as described below, e.g., comprising a polyolefin foam, nitrile rubber foam, polyester foam, polyurethane (PU) foam (preferably closed cell), poly ethylene-vinyl alcohol (PEVA), poly ethylene-vinyl acetate, anchor polyvinyl alcohol foam as the flexible polymer. The insulation layer may preferably comprise a polyethylene-comprising foam as the flexible polymer, e.g., a LDPE, HDPE, LLDPE, VLDPE, metallocene-catalyzed polyethylene, and/or a PE-co-PP, or alternatively or in addition to a polypropylene (PP) and/or expanded PP foam. The flexible polymer of any of these sorts or blends thereof is typically present in an amount of at least 90, 91, 92, 92.5, 93, 94, 95, 96, 97, 97.5, 98, 99, 99.1, 99.5, or 99.9 wt. % of the insulation layer. Polymerized ethylene may itself make out the entire insulation layer, or at least 50, 60, 70, 75, 80, 85, 90, 95, or 99 wt. % of total insulation layer weight, either as a pure PE polymer, as a blend of PE polymers, as a copolymer including polymerized ethylene, as a blend of PE copolymer(s) and/or PE homopolymer(s).

Should PP (or polymers of tacticity-generating monomers) be used as a portion or all of the flexible polymer, its tacticity may be modified to achieve desired properties, such as flexibility, e.g., 10, 15, 20, 25, 35, 40, 50, 60, 70, 75, 80, 85, 90, or 95% atactic and/or syndiotactic, but may be tailored to have regionally specific tacticity, such as diads, triads, tetrads, pentads, . . . N-ads (e.g., N=10, 15, 25, 35, 50, 75, 100-ads, etc.) of isotacticity, syndiotacticity, or atacticity.

Depending upon the application, useful polymer Mw may be at least 2.5, 5, 7.5, 10, 12.5, 15, 17.5, 20, 25, 30, 35, 40, 45, 50, 65, 75, 85, 100, 125, 150, 175, 200, 250, 350, 500, or 1000 kDa and/or up to 5000, 4000, 3500, 3000, 2500, 2000, 1750, 1500, 1250, 1000, 900, 800, 750, 700, 650, 600, 550, 500, 400, 300, 200, 175, 150, 125, 100, 90, 80, 75, 65, 60, 55, or 50 kDa. Relevant PD1s will vary depending upon application, but will generally be in a range of at least 1.05, 1.1, 1.15, 1.25, 1.33, 1.4, 1.5, 1.75, 2, or 2.5 and/or up to 10, 9, 8, 7, 6, 5, 4, 3, 2.5, 2.25, 2, 1.75, or 1.5.

While not limited to these, useful polyolefin, esp. PE, foams may have properties, compositions, and/or preparative techniques as described, for example, in *J. Appl. Polym. Sci.* 2003, 90(8), 2111-2138, *Appl. Polym. Sci.* 2007, 106, 3273-3281, *Cellular Polymers* 2017, 36(4), 167-182, *Cellular Polymers* 2009, 28(1), 25-40, *Polymers* 2019, 11(2), 306, the doctoral thesis entitled "Stabilisation of Low Density, Closed Cell Polyethylene Foam" by Warner Jan Nauta at the Universiteit Twente published 2000, *J. Cell. Plastics* 2016, 53(1), 83-105, U.S. Pat. No. 6,350,512, EP 1 353 979 A2, EP 989 156 B1, WO 2013/174482 A1, EP 585 147 B1, WO 2016/109544 A1 EP 790 273 B1, CN 102343784 B, EP 1 594 919 B1, U.S. Pat. No. 4,347,329, EP 1 1822 24 A1, US 2005/0062184, U.S. Pat. No. 6,414,047, WO 2008/100501 A2, U.S. Pat. No. 7,906,561, EP 2 336 224 A1, each of which is incorporated by reference herein in its entirety.

Inventive panels may further comprise a metal bar configured to extend between the first and second layer, through the insulation layer, in an orientation substantially orthogonal to a surface defined by the panel height and the panel width. The metal bar may comprise steel, e.g., 75, 80, 85, 90, 91, 92, 92.5, 93, 94, 95, 96, 97, 97.5, 98, 99, 99.1, 99.5, or 99.9 wt. % of the total weight of the bar may be steel, and/or the bar may be rebar. The bar may also be made of a non-compressible plastic, such as an optionally filled polyaramide, PES. polyimide, or even polyolefin, whereby relevant fillers may be glass, carbon, and/or mineral fibers and/or impact strengthening particles. Useful bars may generally be in cylindrical form, but may also be in a spiral (screw) shape, or triangular, rectangular, pentagonal, hexagonal, etc. prismic, and the length of the bar will generally be sufficient to extend through the insulation layer into the concrete layers, but will generally not extend beyond the outer surface of the concrete layer(s) in most applications. Certain applications wherein points for affixing further elements to other panels, usually perpendicular to the original panel, may call for one or more bars extending through one or both of the outer surfaces of the concrete layer. Typically, the bars will independently be up to 97.5, 95, 92.5, 90, 85, 80, 75, 70, 65, 60, or 50% of the panel thickness, and typically sufficient to extend through the insulation layer. The panel may comprise one of the metal bar per every 150 to 400 cm$^2$, e.g., any of these endpoints and/or at least one metal bar per at least 165, 175, 185, 200, 210, 220, 225, 230, 235, 240, 245, 250, 255, 260, 265, 270, or 275 cm$^2$ and/or up to 375, 367, 350, 333, 325, 315, 300, 295, 290, 285, 280, or 275 cm$^2$. Inventive panels typically comprise no further metal bars traversing the insulation layer, heightwise, widthwise, thicknesswise, and/or diagonally. Generally, bars penetrating and/or within the inventive panels will have simple (solid) cylindrincal and/or prismic shapes, and need not be specially designed to, impart further structural properties. The concrete/cement layers may likewise be free of further bars, though in certain applications, rebar or other strengthening bars and/or grids may be used in the plane of the height and width of the panels, heightwise, widewise, and/or diagonally. In certain cases, rebar grids with end pieces extending through the insulation layer, e.g., from the outside wall surface (where more strength may be desired) to an inside wall surface.

The panel height may be at least 35 cm, e.g., at least 40, 50, 60, 80, 100, 120, 150, 160, 180, 200, or 240 cm and/or up to 320, 300, 280, 260, 240, 220, 200, 180, 160, 140, 120, 100, or 80 cm (or any other height described herein). The panel width may be at least 20 cm, e.g., at least 25, 30, 35, 40, 50, 60, 80, or 100 cm and/or up to 160, 140, 120, 100, 90, 80, 75, 70, 65, 60, 55, 50, 45, or 40 cm (or any other width described herein). The panel thickness may be at least 10 cm, e.g., at least 12.5, 15, 17.5, 20, 22.5, 25, 27.5, 30, 32.5, 35, 37.5, or 40 cm and/or up to 120, 100, 90, 80, 75, 65, 50, 45, 40, 37.5, 35, 32.5, 30, 27.5, 25, 22.5, or 20 cm (or any other thickness described herein). The insulation layer may have a thickness in a range of from 10 to 50 mm, e g , any of these endpoints and/or at least 12.5, 15, 17.5, 20, 22.5, 25, 27.5, 30, 32.5, 35, 37.5, or 40 cm and/or up to 45, 40, 37.5, 35, 32.5, 30, 27.5, 25, 22.5, or 20 cm (or any other thickness described herein). The first and second layers may independently have a thickness in a range of from 50 to 100 mm, e g , any of these endpoints and/or at least 55, 60, 65, 70, 75, 80, 85, 90, 95, or 100 cm and/or up to 150, 125, 120, 110, 105, 95, 90, 80, 75, 65, or 60 cm (or any other thickness described herein). Inventive panels may comprise no further layers than the insulation layer, the first layer, and the second, and/or may avoid excessive internal metal and/or plastic structures beyond a limited number of orthogonal (to the plane of the height and width) bars. The insulation layer typically directly contacts the first and/or second layers, though in particular cases requiring increased waterproofing, one or more waterproofing sheets may be included. Typically, no glazing or other finishing will be necessary for inventive panels.

Inventive panels may having a cross-section orthogonal to its height axis including 1, 2, 3, 4, 5, 6, or more curves and/or 1, 2, 3, 4, 5, 6, or more angles of at least 15° (or any other angle described herein). Inventive panels may be configured as a pipe or a half-pipe with an inner diameter in a range of from 25 to 200 cm, e.g., any of these endpoints and/or at least 15, 20, 30, 35, 40, 45, 50, 55, 60, 65, 70, 75, 80, 85, 90, 95, or 100 cm and/or, while generally unlimited—i.e., from planar to—up to 1000, 800, 750, 700, 650, 600, 550, 500, 450, 400, 350, 300, 275, 250, 225, 200, 175, 150, 125, 120, 110, 105, 95, 90, 80, 75, 65, or 60 cm (or any other diameter described herein).

Aspects of the invention include methods of making a load-bearing building panel, which methods may comprise: pouring a first concrete layer in a frame in a plane parallel to the ground; providing a flexible polymer foam layer onto the first concrete layer in a plane parallel to the ground; penetrating the flexible polymer foam layer with one metal bar per 100 to 300 cm$^2$ cm (or any other density described herein) orthogonally to the plane parallel to the ground, the bar extending into the first concrete layer and protruding vertically beyond the flexible polymer foam layer; and/or pouring a second concrete layer in a frame in a plane parallel to the ground. Aspects of the invention may includes methods of providing rigid (no longer flexible) cementitious panels having curved and/or angled cross-sections as described herein, i.e., taking advantage of the initial fluidity of the unset concrete and the flexibility of the insulation layer, involving preparative steps as described herein. Inventive methods may provide concrete pours into vertically-oriented frames (i.e., pouring to form the height), which may call for insertion of any bars through the insulation layer prior to the pour, though typically the inventive panels can be prepared by pouring concrete in horizontally-oriented frames (i.e., pouring to form the thickness).

The inventive panels generally comprise outer layers containing at least 75, 80, 85, 90, 91, 92, 92.5, 93, 94, 95, 96, 97, 97.5, 98, 99, 99.1, 99.5, or 99.9 wt. % of a total weight of the outer layers, of one or more standard cement varieties, e.g., ordinary Portland cement (OPC), Portland Pozzolana cement (PPC), rapid hardening cement, quick setting cement, low heat cement, sulfates resisting or super sulfate cement, blast furnace slag cement, high alumina cement, white cement, colored cement, hydrophobic cement, low alkali cement, air entraining cement, expansive cement, hydrographic cement, etc., including that of US 2018/0222798 A1. Useful cements may exclude fiber fillers and/or synthetic additives (particularly synthetic additives for imparting flexibility) or may comprise no more than 15, 10, 7.5, 5, 4, 3, 2, 1, or 0.5 wt. %, relative to the total outer layer weight, of such fiber fillers and/or synthetic additives. Inventive panels are suitable for use as structural concrete wall panel, i.e., in place of solid or rebaarred concrete. Inventive panels may exclude or ed not contain any more than 15, 10, 7.5, 5, 4, 3, 2.5, 2, 1, 0.5, 0.1, 0.01, 0.001, 0.0001, or 0.00001 wt. %, relative to the total outer panel weight, of glass fiber fabric and/or glass fiber nonwoven.

Inventive panels need not have a honeycomb structure and/or may haze no more than 75, 65, 50, 40, 33, 25, 20, 15, 10, 7.5, 5, 4, 3, 2, 1, or 0.5 wt. %, relative to the total surface area, of honeycomb structure, particularly in the outer layers and/or in the sandwiched polymer layer. Inventive panels may exclude or comprise less than 10, 7.5, 5, 4, 3, 2.5, 2, 1, 0.5, 0.1, 0.01, 0.001, 0.0001, or 0.00001 wt. % or only trace amounts, relative to total outer (concrete) component weight, of elasticizer(s), individually or in total. The structural panel outside layers may exclude cement expanded perlite mortar, or may contain no more than 40, 35, 30, 25, 20, 15, 10, 7.5, 5, 4, 3, 2, 1, or 0.5 wt. %, relative to the total cement panel weight, of cement expanded perlite mortar.

Inventive panels are adequately secured without connectors extending in the plane of the panels through the concrete and the flexible insulation layer, and may instead achieve sufficient stability and/or strength with rebar cylinders oriented orthogonally to the plane of the sandwiched panels, embedded within the sandwiched panels, extending from one concrete layer to the other, without extending beyond the outer surface of one or both of the concrete layers, preferably being within the cement, penetrating only the insulation layer. The insulation layer may be a foamed plastic, including one made by reactive injection molding, but need not be inflatable, nor comprise "bubble film"-like construction, e.g., having no gas-containing pockets of greater than 0.05, 0.075, 0.08, 0.09, 0.1, 0.15, 0.2, 0.25, 0.33, 0.5, 0.67, 0.75, or 1 mL. Inventive panels need not include any aluminum layers, or no more than 3, 2, or 1 such aluminum layer.

An aspect of the invention provides a sandwich panel with flexible insulation material, which can address one or more of the shortcomings of the art. Inventive sandwich panels incorporating a flexible insulation material may be more easily fabricated at the cross-sectional center the structural unit is extremely easy. Inventive insulating building materials may be used around utilities or other potential thermal bridges, which may otherwise increase the thermal conductivity of wall units, to reducing the thermal conductivity of the whole structural system. Inventive panels may be may be more easily prepared and/or less expensive than conventional XPS board.

The thermal conductivity of sandwiched panel of different thicknesses of inventive flexible insulating materials can be determined using, e.g., a guarded hot plate. Inventive materials can be modified to increase the thermal resistance with the thickness of insulation layer. For example, the thermal resistance of 50 mm thick insulation layer sandwiched in the middle of the wall section resulted can provide better thermal resistance than XPS boards currently used in wall panels. Inventive insulating materials can provide advantages over known materials, including easy installation, flexibility, simplicity, thermal efficiency, thermal bridge reduction, and/or economy.

Aspects of the invention provide a composite wall unit, preferably with thermally efficient, flexible, simple, and economical insulating material for structural concrete useful in buildings.

Portland cement as described herein can be defined by ASTM C150, European Standard EN 197-1, or any other conventional building materials designation. ASTM C150 defines Portland cement as a hydraulic cement, i.e., cement that not only hardens by reacting with water but also forms a water-resistant product, produced by pulverizing clinkers comprising hydraulic calcium silicates and usually containing one or more of the forms of calcium sulfate as an inter ground addition. The European Standard EN 197-1 defines Portland cement clinker as a hydraulic material having at least two-thirds by mass of calcium silicates, (3 $CaO.SiO_2$, and 2 $CaO.SiO_2$), with a remainder of aluminum- and iron-containing clinker phases and other compounds. The ratio of CaO to $SiO_2$ according to European Standard EN 197-1 cannot be less than 2.0, while the magnesium oxide content (MgO) cannot exceed 5.0% by mass. Properties and compositions of relevant cements/concretes are described in, for example, Kosmatka, S. H., Panarese, W. C. *Design and Control of Concrete Mixtures,* Skokie: Portland Cement Association, 1988 (ISBN 978-0-89312-087-0); Ramachandran, V. S., Feldman, R. F. *Concrete Admixtures Handbook: Properties, Science, and Technology,* ed. V. Ramachandran, Park Ridge, N.J.: Noyes Publications, 1984; Mehta, P. K. *Concrete: Structure, Properties, and Materials.* Englewood Cliffs, N.J.: Prentice-Hall, 1986; Mehta, P. K., Monteiro, P. J. M. *Concrete: Microstructure, Properties, and Materials,* Fourth Ed. New York: McGraw-Hill, 2014; Kosmatka, S. H., Wilson, M. L. *Design and Control of Concrete Mixtures,* 16th Ed. Skokie: Portland Cement Association, 2016; Shetty, M. S. *Concrete Technology: Theory and Practice,* New Delhi: Chand & Co. Ltd, 2006, McCormac, J. C., Brown, R. H. *Design of Reintbrced Concrete,* 10th Ed. Hoboken, N. Mex.: Wiley, 2015, each of which is incorporated by reference in its entirety herein.

Clinkers generally make up more than 90% of the cement, along with a limited amount of calcium sulfate ($CaSO_4$, which controls the set time), and typically up to 5% minor constituents (fillers) as allowed by various standards. Clinkers are spheres with diameters of 0.2 to 1.0 inch, ca. 5.1 to 25.4 mm, of a sintered material that is produced when a raw mixture of predetermined composition is heated to high temperature. The key chemical reaction which defines Portland cement from other hydraulic limes occurs at above 1,300° C. as belite, $Ca_2SiO_4$, combines with calcium oxide, CaO, to form alite, $Ca_3SiO_5$.

Figure 9:
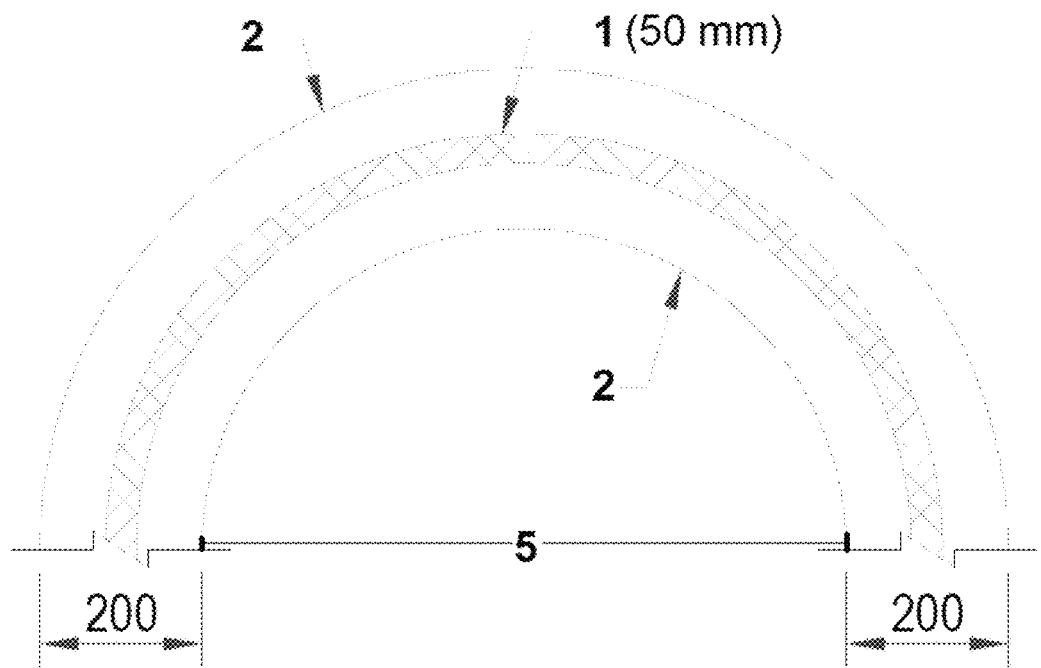
FIG. 9 shows an exemplary circular or semi-circular geometry vertical load bearing element with centrally placed flexible insulation.
Figure 10:
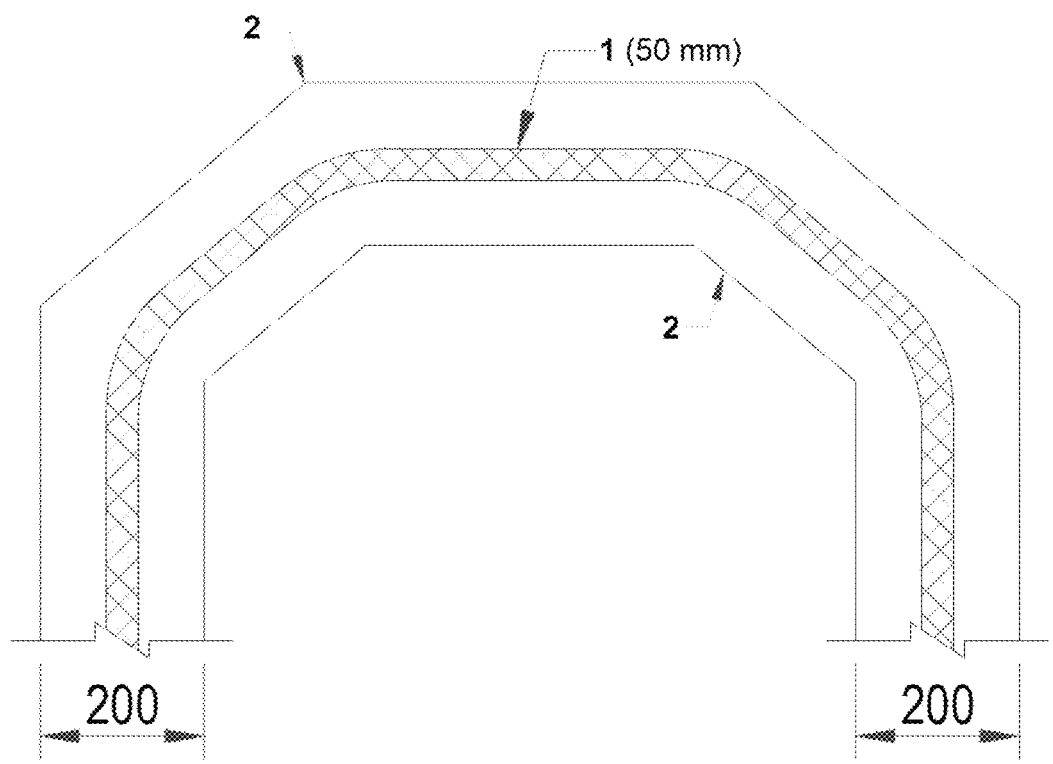
FIG. 10 shows an exemplary discontinuously curved or an irregular geometry vertical load bearing element with centrally placed flexible insulation.

FIGS. 9 and 10 show geometries of vertical load bearing elements with centrally placed PE flexible insulation. An aspect of the invention is providing structural support panels and elements comprising flexible insulation, which panels or elements can be placed into the types of geometries illustrated in FIGS. 9 and 10. The inventive use of (particularly PE) insulation can be used in any irregular geometries, while rigid insulation such as XPS board cannot be easily installed in these types of geometries. Flexible insulation (e.g., PE foam) can in partition dry walls such as gypsum wallboards in a similar manner Aspects of the invention may provide roofs of steel buildings contain sandwiching corrugated sheets containing flexible insulation. An advantage of flexible insulation is that it can be wrapped around the building utilities. Such flexible insulation can accommodate bending of structural elements, e.g., under seismic forces and/or with repeated vibrations acting on the structure, e.g., walls, floors, roofs, tunnels for public transit, subways, trains, or cars. Customary rigid insulation of the art cannot accommodate bending and/or repeated vibrations.

EXAMPLES

MATERIALS AND METHODS: Ordinary Portland cement concrete with constituent materials shown in Table 1 was used to fabricate sandwiched panel with different thicknesses of proposed insulating material.

TABLE 1

Constituent materials for the two concrete layers.

| Mix # | Water/Cement | OPC $kg/m^3$ | Coarse Agg. $kg/m^3$ | Fine Agg. $kg/m^3$ |
|---|---|---|---|---|
| M1 | 0.4 | 400 | 1230 | 660 |

Figure 2:
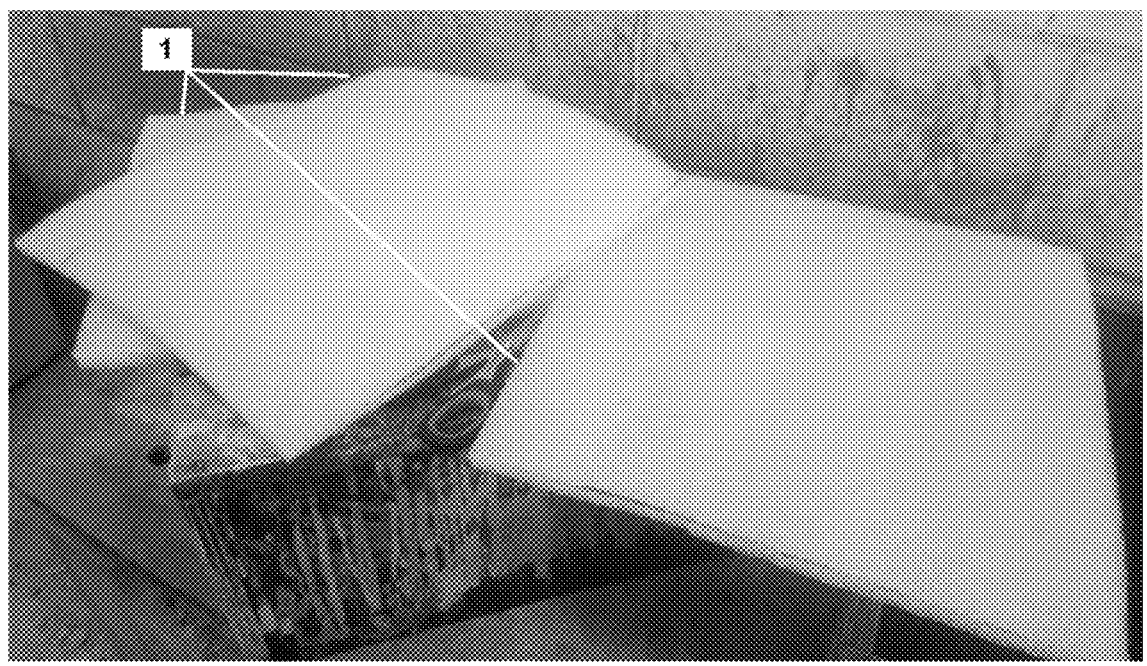
FIG. 2 shows an image of suitable flexible insulating material for sandwiching between cement panels.

An aerated polyethylene sheet (insulation material—foamed polyolefin) was provided, and a sandwiched concrete wall panel was prepared in square shape with 350 mm sides and an overall thickness of 200 mm. The insulation material was placed at the center of a wall section. Three different thicknesses of insulation were used 15, 30, and 50 mm which are illustrated in FIG. 1. The insulation material is locally available which is extremely flexible in nature as shown in FIG. 2. The insulation is a flexible polyethylene foam sheet and the technical properties are as follows: Density (gr/cm3) –0.04 (ASTM-D792); Cell size (mm) 0.82 (ASTM-D3576); Thermal conductivity (W/m ° C) –0.055 (ASTM-C177); Water absorption (mg/cm2) –1.2/20 mm thick (ASTM-D570).

THERMAL PERFORMANCE: The thermal conductivity was measured under steady-state conditions using a guarded hot plate conforming to the ASTM Standard C-177. Individual layers of sandwiched panel samples of dimensions 350 mm×350 mm were prepared and tested for thermal conductivity on the guarded hot plate. Due to thickness limitations for testing of the samples on the guarded hot plate, the individual layers of the sandwiched wall panel were tested separately, and the thermal performance parameters were calculated for the sandwiched wall panel. A DYNATECH guarded hot plate TCFG-R4-6 thermal conductance measuring system was used to determine the thermal conductivity. The accuracy of the testing machine was found to be about ±4% of the true value of the thermal conductivity. During the tests, the average temperature of the samples was kept at about 34.0±1.5° C.

COMPRESSIVE STRENGTH: Compressive strength of 100 mm concrete cube specimens was determined according to ASTM C 39 using a MATEST C55 digital compression testing machine. The compressive strength of specimens was determined after 3, 7, 14, and 28 days of water curing. Triplicate specimens were tested and the average values are reported.

Figure 3:
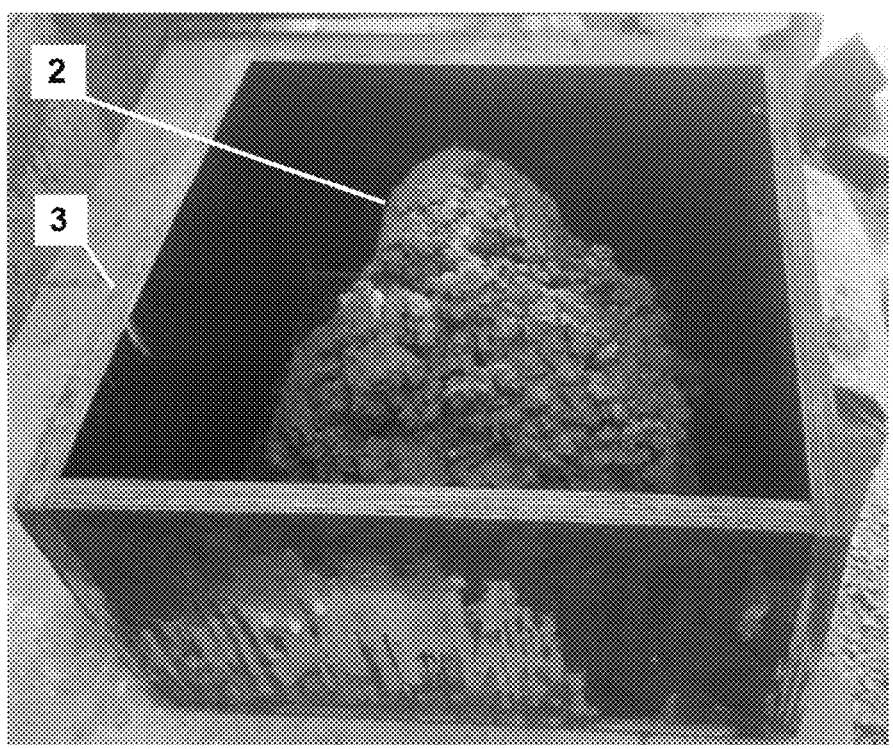
FIG. 3 shows an exemplary casting concrete in a first layer of the sandwiched load-bearing panel within the scope of the invention.
Figure 4:
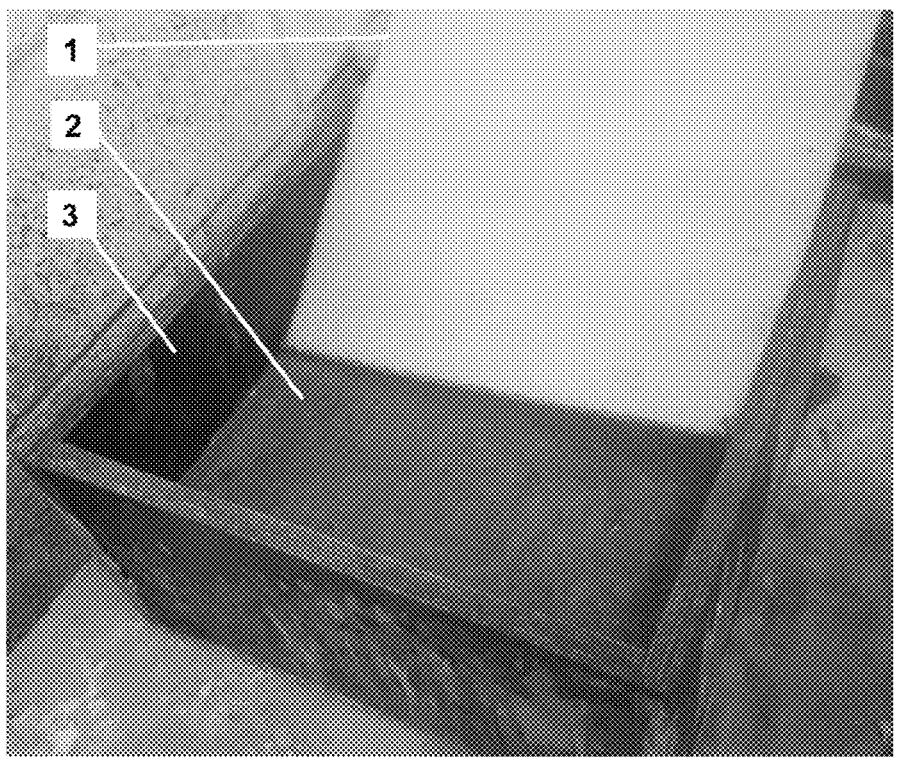
FIG. 4 shows a placement of an insulating layer on top of a first layer of concrete for making an exemplary load-bearing panel within the scope of the invention.
Figure 5:
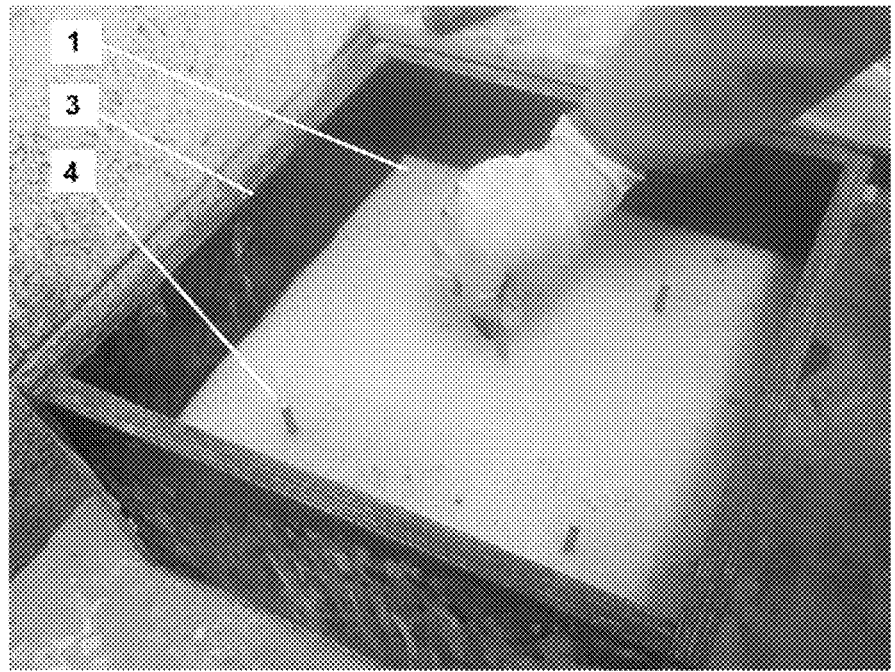
FIG. 5 shows an insertion of rebar connectors into a precursor to an exemplary load-bearing panel within the scope of the invention.
Figure 6:
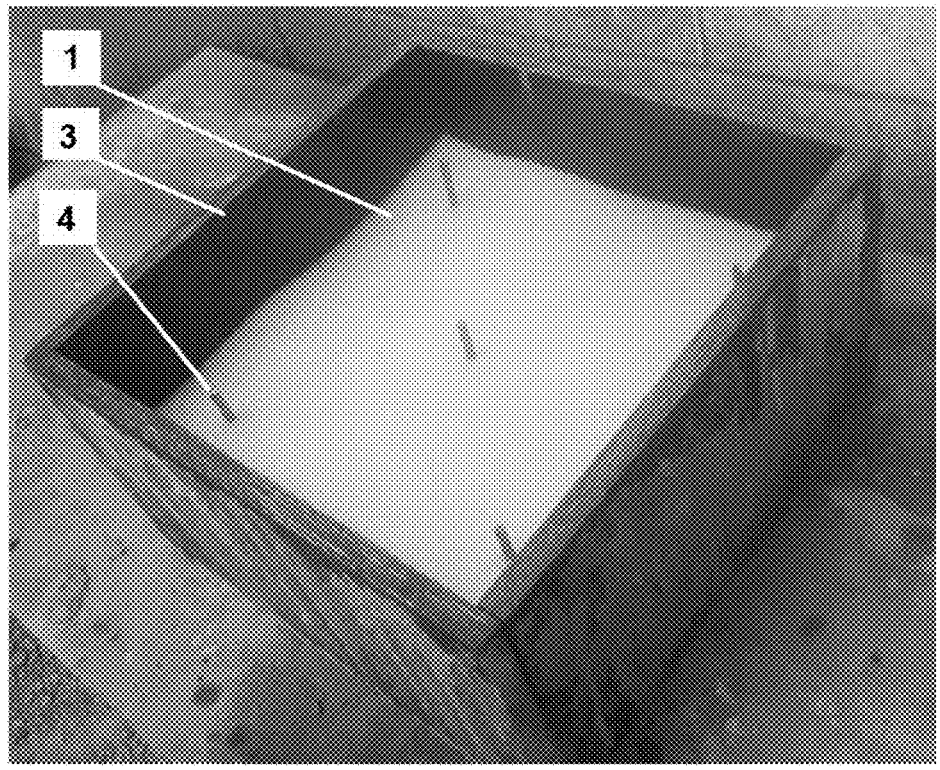
FIG. 6 shows a cement panel and flexible polymer layer with installed rebar connectors as a precursor to an exemplary load-bearing panel within the scope of the invention.
Figure 7:
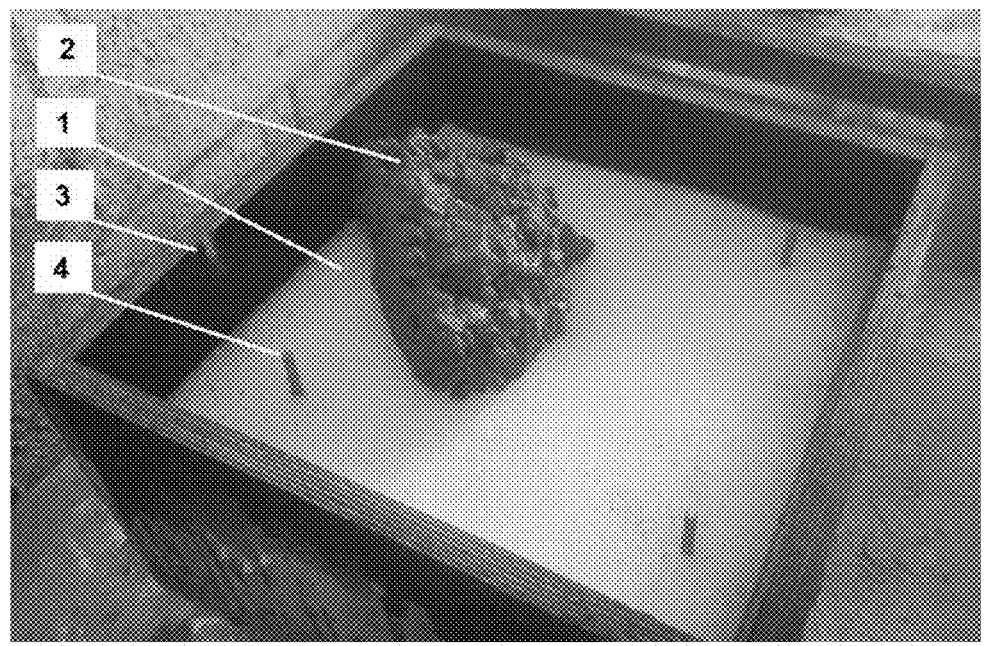
FIG. 7 shows a pour of concrete to form the top layer of an exemplary load-bearing panel within the scope of the invention.
Figure 8:
FIG. 8 shows further pouring of concrete to form the top layer of an exemplary load-bearing panel within the scope of the invention.

PREPARATION OF SPECIMENS: For preparing the inventive sandwiched concrete wall panels, a bottom layer of concrete was first cast as shown in FIG. 3. Subsequently, an insulation layer was placed on the top of bottom layer. In order to connect bottom concrete layer with the top having insulating material in between, 6 mm diameter reinforcing bars were inserted into the bottom layer such that the other end of the bar was embedded in the top layer of concrete. FIGS. 4 to 8 illustrate the casting of sandwiched panel. After pouring each layer of concrete, the wet wall panel sandwich structure was vibrated to flush out air pockets. Subsequently, the sandwiched panels were trowel finished on the surface and cured for seven days under wet burlap.

Results

THERMAL PERFORMANCE: The thermal conductivity test results are reported in Table 2 for the individual layers of the sandwiched concrete panel.

TABLE 2

Thermal conductivity test results of the individual layer samples of an exemplary sandwiched wall panel.

| Sample No. | Panel Type | Dimensions cm | Thermal Conductivity W/m · K |
|---|---|---|---|
| 1 | Solid Concrete Panel | 35 × 35 × 7.5 | 1.138 |
| 2 | Polyethylene (PE) Insulation | 35 × 35 × 5.0 | 0.055 |

The equivalent thermal conductivity and thermal resistance I conductance (surface to surface) were calculated for the normal concrete panel and the sandwiched wall panels of 200 mm thickness. The thermal parameters were calculated for varied thicknesses of an exemplary polyethylene (PE) insulation layer, sandwiched between the two solid concrete layers of panels exemplified in FIG. 1. The calculated thermal performance parameters for the sandwiched wall panels are shown below in Table 3.

TABLE 3

Thermal performance parameters for exemplary sandwiched wall panels with outer layers of normal weight concrete.

| Wall Panel Type[1] | Thickness, m | k-value, W/m · K | R-value, m² · K/W | C-value, W/m² · K | Difference in R-value, % |
|---|---|---|---|---|---|
| 1. Solid Concrete Panel | 0.200 | 1.136 | 0.176 | 5.682 | Reference |

TABLE 3-continued

Thermal performance parameters for exemplary sandwiched wall panels with outer layers of normal weight concrete.

| Wall Panel Type[1] | Thickness, m | k-value, W/m · K | R-value, m² · K/W | C-value, W/m² · K | Difference in R-value, % |
|---|---|---|---|---|---|
| 2. Sandwiched 15 mm PE Insulation Concrete Panel | 0.200 | 0.459 | 0.436 | 2.294 | 147.7 |
| 3. Sandwiched 30 mm PE Insulation Concrete Panel | 0.200 | 0.288 | 0.695 | 1.439 | 294.9 |
| 4. Sandwiched 50 mm PE Insulation Concrete Panel | 0.200 | 0.192 | 1.041 | 0.961 | 491.5 |

[1]Due to the limitations of the guarded hot plate individual layers of sandwiched wall were tested separately and the values are calculated for the sandwiched wall panel of 200 mm thickness; Panel layers consist of Solid Concrete + Polyethylene Insulation (15, 30, and 50 mm) + Solid Concrete; The reported values, based on the thickness of the sandwiched wall panel, are for surface, to surface of the wall panel.

The results of the thermal performance parameters in the table shows that the insulated sandwiched wall panels using 15, 30, and 50 mm thick PE insulation have ~1.5 to 5 times higher thermal insulation, e.g., any of these endpoints and/or at least 1.25, 1.3, 1.33, 1.4, 1.45, 1.5, 1.65, 1.75, 1.85, 1.9, 1.95, 2, 2.15, 2.25, 2.33, 2.5, 2.67, 2.75, 2.85, 3, 3.15, 3.25, 3.33, 3.5, 3.67, 3.75, 4.15, 4.25, 4.33, 4.5, 4.67, 4.75, 4.85, or 4.95-fold and/or up to 10, 9, 8, 7.5, 7, 6.75, 6.5, 6.25, 6, 5.85, 5.75, 5.67, 5.5, 5.33, 5.25, 5.15, 5, 4.95, 4.85, 4.75, 4.67, or 4.5-fold, than the (uninsulated) solid concrete panel. The insulated sandwiched panels of the present disclosure can be thermally effective in controlling the heat flow through the building structure. The selection of the sandwiched concrete panels among the types 2 to 4 can be used depending on the structural requirement.

UNIT WEIGHT AND COMPRESSIVE STRENGTH: The density of concrete wall panels with and without insulation layer is shown in Table 4.

TABLE 4

Unit weight of composite wall panels.

| Sample # | Panel Type | Thickness of insulation cm | Dimensions cm | Weight g | Unit Weight, kg/m³ |
|---|---|---|---|---|---|
| 1 | Uninsulated | 0 | 35 × 35 × 20 | 57.55 | 2349 |
| 2 | Insulating | 1.5 | 35 × 35 × 20 | 53.18 | 2171 |
| 3 | Panel | 3.0 | 35 × 35 × 20 | 48.63 | 1985 |
| 4 | | 5.0 | 35 × 35 × 20 | 43.70 | 1784 |

The density of the exemplary inventive insulated wall panels was in the range of 1784 to 2171 kg/m³. The highest density was in the exemplary inventive sample having 15 mm thick insulation, and the lowest density was in the specimen with a 50 mm thick insulation element. The density of all the exemplary inventive insulated panels was less than the conventional concrete panel without insulation.

Table 5 illustrates the compressive strength results of the concrete after 7, 14 and 28 days of curing (7 days of curing 1-a, 2-a, 3-a; 14 days of curing 1-b, 2-b, 3-b; 28 days of curing 1-c, 2-c, 3-c). The average 28-day compressive strength was about 40.0 MPa.

TABLE 5

Compressive strength of concrete.

| Sample # | Curing Period (days) | Length (cm) | Width (cm) | Failure Load kN | Compressive strength, MPa | Avg. comp strength, MPa |
|---|---|---|---|---|---|---|
| 1-a | 7 | 10.04 | 10.04 | 388.94 | 38.58 | 36.73 |
| 2-a |   | 10.04 | 10.08 | 351.96 | 34.78 |   |
| 3-a |   | 10.22 | 10.01 | 376.78 | 36.83 |   |
| 1-b | 14 | 10.06 | 10.13 | 407.32 | 39.97 | 39.57 |
| 2-b |   | 10.13 | 10.06 | 370.21 | 36.33 |   |
| 3-b |   | 10.16 | 10.03 | 432.26 | 42.42 |   |
| 1-c | 28 | 10.07 | 10.03 | 400.41 | 39.64 | 40.60 |
| 2-c |   | 10.08 | 10.23 | 409.82 | 39.74 |   |
| 3-c |   | 10.07 | 10.01 | 427.61 | 42.42 |   |

The unit volume weight of the composite wall panel may be further reduced if the outer layer of normal weight concrete is replaced with the lightweight perlite aggregate concrete, as described in US 2018/0222798 A1, which is incorporated by reference herein in its entirety. The unit weight and the compressive strength of exemplary perlite aggregate concrete samples are set forth below in Table 6.

TABLE 6

Properties of composite panel if perlite aggregate concrete is used.

| Mix Constituents | Unit Weight, kg/m$^3$ | 28 days compressive strength, MPa | Unit weight of composite wall panel, kg/m$^3$ |
|---|---|---|---|
| 10% Perlite aggregate concrete | 1960 | 41.6 | 1527 |
| 15% Perlite aggregate concrete | 1771 | 31.1 | 1395 |

The lightweight concrete was prepared by replacing coarse aggregate with the expanded perlite aggregate. Therefore, if lightweight expanded perlite aggregate concrete at 10% and 15% replacement level is used in panels within the scope of the invention, the unit volume weight of composite panels may be educed further to 1527 kg/m$^3$ and 1395 kg/m$^3$, respectively (thickness of PE was 50 mm). The compressive strength of 10% perlite aggregate concrete was 41.6 MPa, which is sufficient to be used as structural concrete. The compressive strength of 15% perlite aggregate concrete was 31.1 MPa, which is likewise sufficient to be used as structural concrete.

Aspects of the invention provide composite wall system(s) having a unit volume weight of about 1784 with 50 mm thick insulation, about 25% lesser than the normal weight concrete. Unit volume weights for panels including 50 mm-thick insulation may be, for example, at least 1700, 1715, 1725, 1733, 1740, 1750, 1760, 1767, 1775, 1780, 1785, 1790, 1795, 1800, 1805, 1810, 1815, 1820, or 1825 kg/m$^3$ and/or up to 2345, 2333, 2325, 2315, 2300, 2275, 2250, 2225, 2200, 2175, 2150, 2125, 2100, 2075, 2050, 2025, 2000, 1975, 1950, 1925, or 1900 kg/m$^3$.

Aspects of the invention include composite wall system(s) using flexible insulating material, which can be formed and installed in the wall panel as well as around building utilities such as plumbing and electrical pipes, i.e., formed into curved or geometric cross-sectional shapes. For example, the flexibility of the insulating (generally, or simply "polymer") sheet may allow for forming a half-pipe, i.e., axially bisected cylindrical pipe, having a diameter of 400, 300, 275, 250, 225, 200, 175, 150, 125, 115, 110, 105, 100, 95, 90, 85, 80, 75, 70, 65, 60, 55, 50, 45, 40, 35, 30, 25, 20, 17.5, 15, 12.5, 10, 9, 8, 7, 6, 5, 4, 3, 2, or 1 cm up to even folding upon itself. The degree of bending implementable in inventive panels or concrete panel elements may be limited by the concrete more than the polymer layer. Even arrangements with a (solid) cylindrical, concrete core, surrounded by a polymer layer, surrounded by a concrete shell, may be manufactured.

Aspects of the invention comprise composite wall panels using, e.g., at least 10, 12.5, 15, 17.5, 20, 25, 30, 35, 40, 45, or 50 cm and/or up to 100, 90, 80, 75, 70, 65, 60, 55, 50, 45, or 40 cm polymer (insulation) sheets, with thermal resistance comparable to equal or thicker XPS board (e.g., 50 cm PE insulation layer can roughly compare to 50 cm XPS). Moreover, the cost of inventive insulation material may be comparable to or lower than XPS board.

Aspects of the invention provide insulated concrete panels with flexible polymer (esp. polyolefin, such as PE, PP, PB, and/or PIB, or copolymers, terpolymers, and/or blends of these, as well as, e.g., polyurethane) layers provides equal or higher thermal resistance to known composite wall panels, but may be more flexible, curveable, cheaper, and/or easier to install. Also, inventive wall units coupled with a hollow core slab can provide a fast track construction.

Typical components of Portland cement may include tricalcium silicate, $Ca_3SiO_5$ or $3CaO.SiO_2$ (cement notation, $C_3S$), alite; dicalcium silicate $Ca_2SiO_4$ or $2CaO.SiO_2$ (cement notation, $C_2S$), i.e., belite; tricalcium aluminate, $Ca_3Al_2O_6$ or $3CaO.Al_2O_3$ (cement notation, $C_3A$), i.e., aluminate; tetracalcium aluminoferrite, $Ca_2AlFeO_5$ or $4CaO.Al_2O_3.Fe_2O_3$ (cement notation, $C_4AF$), i.e., ferrite; calcium hydroxide, $Ca(OH)_2$ or $CaO.H_2O$ (cement notation, CH), i.e., portlandite; calcium sulfate dihydrate, $CaSO_4.2H_2O$ or $CaO.SO_3.2H_2O$ (cement notation, $C_SH_2$), i.e., gypsum; and calcium oxide, CaO (cement notation, C), lime. Roughly 90-95% of a Portland cement includes the four main cement minerals, $C_3S$, $C_2S$, $C_3A$, and $C_4AF$, with the remainder consisting of calcium sulfate, alkali sulfates, unreacted (free) CaO, MgO, and other minor constituents left over from the clinkering and grinding steps. The four cement minerals play different roles in the hydration process that converts the dry cement into hardened cement paste. The $C_3S$ and the $C_2S$ contribute virtually all of the beneficial properties by generating the main hydration product, C-S-H gel. However, the $C_3S$ hydrates much more quickly than the $C_2S$ and thus is responsible for the early strength development. The $C_3A$ and $C_4AF$ minerals also hydrate, but the products that are for med contribute little to the properties of the cement paste.

$C_3S$ is the most abundant mineral in portland cement, making out 40 to 70 wt. % of the cement. The hydration of $C_3S$ gives cement paste most of its strength, particularly early on. Pure $C_3S$ can form with three different crystal structures. At temperatures below 980° C. the equilibrium structure is triclinic, while at temperatures between 980 and 1070° C., the $C_3S$ structure is monoclinic, and above 1070° C. it is rhombohedral. The triclinic and monoclinic $C_3S$ structures each have three polymorphs, though there are no significant differences in the reactivity of these. The most important feature of the structure is an imperfect packing of the calcium and oxygen ions leaving voids in the crystal lattice. The ions do not fit together well, causing the $C_3S$ crystal structure to have a high internal energy. As a result, $C_3S$ is highly reactive. The $C_3S$ formed in a cement clinker contains ~3 to 4% of oxides other than CaO and $SiO_2$, typically up to 1 wt. % of MgO, $Al_2O_3$, and $Fe_2O_3$, and smaller amounts of $Na_2O$, $K_2O$, $P_2O_5$, and $SO_3$.

$C_2S$ can form with a variety of different structures: a high temperature α structure with three polymorphs, a β structure in that is in equilibrium at intermediate temperatures, and a low temperature γ structure. Gamma-$C_2S$ has a stable crystal structure that is unreactive in water. The β-$C_2S$ structure is stabilized by the other oxide components of the clinker. The γ-form is generally not present in Portland cement. The crystal structure of b-$C_2S$ is irregular, but less so than that of $C_3S$, accounting for the lower reactivity of $C_2S$. The $C_2S$ in cement contains ~4 to 6 wt. % substitution of oxides, including $Al_2O_3$, $Fe_2O_3$, and $K_2O$.

$C_3A$ makes out anywhere from 0.1 to 14% of a Portland cement. Like $C_3S$, $C_3A$ is highly reactive, releasing a significant amount of exothermic heat during the early hydration period. Hydration products formed from $C_3A$ contribute little to the strength or other engineering properties of cement paste. Sulfate ions can cause $C_3A$ and its products to harm the concrete by participating in expansive reactions leading to stress and cracking. Pure $C_3A$ forms only with a cubic crystal structure, having $Ca^{2+}$ atoms and rings of six $AlO_4$ tetrahedra. The bonds in $C_3A$ are distorted from their equilibrium positions, leading to a high internal energy and a high reactivity. CaO and $Al_2O_3$ in the $C_3A$ structure can be replaced by other oxides, and at high levels of substitution this can lead to other crystal structures. $C_3A$ Portland cement clinker typically contains around 13% oxide substitution, but remains primarily cubic with smaller amounts of orthorhombic $C_3A$. $C_3A$ and $C_4AF$ form by simultaneous precipitation as the liquid phase formed during the clinkering process cools, and thus they are closely intermixed, making it difficult to ascertain the exact compositions of the two phases. The cubic form generally contains ~4 wt. % $SiO_2$, ~5 wt. % $Fe_2O_3$, and ~1 wt. % each of $Na_2O$, $K_2O$, and MgO. The orthorhombic form has similar levels, but with a greater (~5%) substitution of $K_2O$.

$C_4AF$ is an approximation that representing the midpoint of compositions between $C_2A$ and $C_2F$. The crystal structure of $C_4AF$ is believed to be related to perovskite, and the actual composition of $C_4AF$ in cement clinker is generally higher n aluminum than in iron, with considerable substitution of $SiO_2$ and MgO. A typical composition in normal chemical notation was reported to be $Ca_2AlFe_{0.6}Mg_{0.2}Si_{0.15}Ti_{0.5}O_5$. However, the composition of $C_4AF$ varies depending on the overall composition of the cement clinker.

The rough amounts of the components in Portland cement are CaO in roughly 60.2 to 66.3 wt. % or 60 to 70 wt. %, $SiO_2$ in roughly 18.6 to 23.4 wt. % of 20 to 25 wt. %, $Al_2O_3$ in roughly 2.4 to 6.3 wt. % or 3 to 8 wt. %, $Fe_2O_3$ in roughly 1.3 to 6.1 wt. % or 2 to 4 wt. %, MgO in roughly 0.6 to 4.8 wt. % or 1 to 4 wt. %, $Na_2O$ in roughly 0.05 to 1.20 wt %, $K_2O$ in roughly 0.05 to 1.20 wt. %, $SO_3$ in roughly 1.7 to 4.6 wt. % to 1 to 5 wt. %, optionally $P_2O_5$ ca. 0.11 wt. % in final compositions, and optionally $TiO_2$ ca. 0.22 wt. % in final compositions. Portland cement classes include Type I general purpose cement with high $C_3S$ content for good early strength development, Type II moderate sulfate resistance cement with less than 8 wt. % $C_3A$ content, Type III high early strength cement which is tore finely ground and may have slightly more C3S, Type IV low heat of hydration (slow reacting) cement, with less than 50 wt. % $C_3S$ and C3A content, and Type V high sulfate resistance cement, with less than 5 wt. % $C_3A$ content, and decorative white cement with no $C_4AF$ and low MgO.

The flexible (insulating) layer may comprise at least 75, 80, 85, 90, 91, 92, 92.5 93, 94, 95, 96, 97, 97.5, 98, 99, 99.1, 99.5, or 99.9 wt. % of a total weight of the flexible sandwiched layer, of a polyolefin, such as polyethylene (PE), e.g., LDPE, HDPE, LLDPE, VLDPE, metallocene-catalyzed polyethylene, a polypropylene (PP), a PF-co-PP foam, expanded PP, nitrile rubber foam, polyester, polyurethane (PU), poly ethylene-vinyl alcohol (PEVA), poly ethylene-vinyl acetate, polyvinyl alcohol, polycaprolactone, and/or polylactic acid, generally in the form of foams. Polystyrene (PS) is generally not sufficiently flexible for use in inventive panels, though it may be blended or checkered into the flexible layer in an amount of no more than 15, 10, 7.5, 5, 4, 3, 2, 1, or 0.5 wt. % of the flexible layer. Advantageously, inventive panels may avoid PS as desired, which is particularly relevant to curved panels and/or breathable panels for more humid climates prone to molding on concrete.

Flexible materials useful in inventive panels may have densities in a range of from 0.01 to 0.55 g/cm³ according to ASTM D-792, e.g., any of these endpoints and/or at least 0.012, 0.015, 0.0175, 0.02, 0.0225, 0.025, 0.0275, 0.03, 0.0325, 0.035, 0.0375, 0.04, 0.0425, 0.045, 0.05, 0.06, 0.075, or 0.1 g/cm³ and/or up to 0.5, 0.45, 0.4, 0.35, 0.3, 0.25, 0.2, 0.175, 0.15, 0.125, 0.1, 0.095, 0.09, 0.0875, 0.085, 0.0825, 0.08, 0.0775, 0.075, 0.0725, 0.07, 0.0675, 0.065, 0.0625, or 0.06 g/cm³. Flexible materials useful in inventive panels may have thermal conductivities according to ASTM D-5930 and/or ASTM C518 of, e.g., at least 0.01, 0.015, 0.02, 0.025, 0.03, 0.035, 0.04, 0.045, or 0.05 W/mC and/or up to 0.1, 0.09, 0.085, 0.08, 0.075, 0.07, 0.065, 0.06, 0.055, 0.05, 0.045, 0.04 W/mC (generally over 0.03 W/mK) Flexible materials useful in inventive panels may have tensile strengths according to ASTM D-638 of, at least 1, 1.5, 1.75, 2, 2,25, 2.33, 2.5, 2.67, 2,75, 3, 3.25, 3.33, 3.5, 3.67, 3.75, 4, 4.25, 4.33, 4.5 4.67, 4.75, or 5 kg/cm² and/or up to 10, 9, 8, 7, 6.5, 6.25, 6, 5.75, 5.67, 5.5, 5.33, 5.25, 5, 4.85, 4.75, 4.67, 4.5, 4.33, 4.25, or 4 kg/cm². Flexible materials useful in inventive panels may have elongations according to ASTM D-638 of, e.g., at least 60, 65, 67, 70, 72.5, 75, 77.5, 80, 82.5, 85, 87.5, 90, 92.5, or 95% and/or up to 125, 120, 115, 110, 107.5, 105, 102.5, 100, 99, 98, 97, 96, 95, 92.5, or 90%. Flexible materials useful in inventive panels may have permanent compression sets (100 kg/cm²) according to an Arnon Method of, e.g., at least 5, 7.5, 10, 12.5, 15, 16.5, 17.5, 18, 19, 20, 21, 22, 23, 24, or 25% and/or up to 30, 29, 28, 27, 26, 25, 24, 23, 22, 21, 20, 19, 18, or 17.5% Flexible materials useful in inventive panels may have cell sizes (avg. diameters) according to ASTM D-3576 of e.g., at least 0.05, 0.1, 0.15, 0.2, 0.25, 0.3, 0.35, 0.4, 0.45, 0.5, 0.55, 0.6, 0.65, 0.7, 0.75, 0.8, 0.825, or 0.85 mm and/or up to 2, 1.75, 1.5, 1.25, 1.15, 1.10, 1.05, 1, 0.95, 0.9, 0.85, 0.8, 0.75 mm.

The flexibility of the polymer layer, according to EN 12089 should generally be greater than that of building insulation PS and/or expanded polystyrene foams. For example, a useful stiffness may be less than 1000, 950, 900, 850, 800, 750, 700, 650. 600, 550, 500, 400, or 250 N/m; Young's modulus may be less than 40, 35, 30, 25, 20, 15, or 10 MPa; maximum bending stress of up to 0.8, 0.7, 0.6, 0.55, 0.5, 0.45, 0.4, 0.35, 0.33, 0.3, 0.25, 0.2, or 0.1 MPa; maximum bending strain at maximum load of up to 0.1, 0.095, 0.09, 0.085, 0.08, 0.075, 0.07, 0.065, 0.06, 0.055, 0.05, 0.045, 0.04, or 0.035; maximum bending strain at failure of up to 0.075, 0.07, 0.065, 0.06, 0.055, 0.05, 0.045, 0.04, 0.035, 0.03, 0.025, 0.02, 0.015, or 0.01; and/or maximum extension at maximum load of at least 100, 110, 125, 133, 140, 145, 150, 160, 165, 175, 200, 225, 250, 275, 300, or 350 mm and/or up to 2000, 1750, 1500, 1250, 1000, 900, 800, 750. 700, 650, 600, 550, or 500 mm.

The flexural strength of the flexible layer determined by IS 4671:1984 on a 300×200×50 (t1 mm sample for 4, 8, and 12 kg/m³ using a universal testing machine, calculated as 1.5 WL/(BD²), where W is applied load in N, L is the length between the supports, B is the width of the specimen, and D is the thickness of the specimen in mm, may have a maximum load up to 0.55, 0.5, 0.45, 0.4, 0.35, 0.3, or 0.25 kN; a maximum contraction of at least 30, 32.5, 35, 37.5, 40, 42.5, or 45 mm and/or up to 100, 85, 75, 65, 60, 55, 50, or 45 mm; and/or flexural strength up to 0.25, 0.20, 0.15, 0.1, 0.05, 0.01, or 0.009 MPa. For 100 mm thick samples under other rise identical conditions useful flexible layers may have a maximum load up to 0.85, 0.8, 0.75, 0.7, 0.65, 0.6, 0.55, 0.5, or 0.45 kN; a maximum contraction of at least 50, 52.5, 55, 57.5, 60, 62.5, 65, 67.5, 70, 72.5, or 75 mm and/or up to 150, 135, 125, 115, 110, 105, 100, or 95 mm; and/or flexural strength up to 0.1, 0.05, 0.01, 0.009, 0.008, 0.0075, 0.007, 0.0065, 0.006 MPa. Generally, useful flexible layers may have flexural strengths may vary between 0.1 and 100 kPa.

Referring now to the drawings, wherein like reference numerals designate identical or corresponding parts throughout the several views.

FIG. 1 shows three exemplary wall panels of 200 mm overall thickness respectively having 15, 30, and 50 mm thick flexible polymer layers 1, preferably insulating, sandwiched by cement/concrete slabs 2. The wall panels may have overall thicknesses of, e.g., at least 10, 12.5, 15, 17.5, 20, 22.5, 25, 30, 35, 40, 45, or 50 cm and/or up to 200, 150, 100, 80, 60, 50, 40, or 30 cm. Although the wall panels in FIG. 1 is shown as 35 cm in a vertical direction, the panels may he, for example, at least 25, 35, 50, 60, 75, 80, 100, 120, 125, 150, 180, or 200 cm and/or up to 300, 275, 250, 240, 225, 200, 180, 150, 120, 100, 80, 75, 60, 45, or 35 cm. The remainder of the inventive wall panels (thickness) may be made out by concrete, e.g., two 75 mm concrete slabs for a 50 mm flexible plastic layer, though additional intervening layers may also be present, either between the concrete and the flexible layer, inside the concrete and/or flexible layer, or outside the concrete layer(s), such as water impermeable films (particularly for panels intended to be sunken into the ground, used in pools, applied to docks or waterways, used in (sewer, drainage, electrical etc.) pipes, troughs, or the like. Inventive panels may also be formed into hemispheric or partial spherical, (partial) dodecahedral, (partial) rhombo-hexagonal, (partial) rhombo-square. (partial) tapezo-rhombic, (partial) rhombo-triangular, and/or (partial) icosahedral shape, i.e., 3-dimensionally curved, as well as irregular 3D shapes.

While examples herein are described as square in panel plane dimensions, i.e., orthogonal to the thickness, inventive panels may be rectangular with a height-to-width ratio of, e.g., at least 1:1, 1.5:1 2:1, 2.5:1, 3:1, 3.5:1, 4:1, or 5:1 and/or up to 10:1, 8:1, 7.5:1, 6:1, 5:1, 4:1, 3,5:1, 3.2:1, 3:1, 2.8:1, 2.5:1, 2.4:1, 2.2:1 or 2:1. Inventive panels of any of these dimensions (or other dimensions) may be bent so as to have 1, 2, 3, 4, 5, 6, or more angles (viewed from the cross-sectional plane of the floor) of, e.g., 12, 15, 21, 24, 27, 30, 33, 36, 39, 42, 45, 48, 51, 54, 57, 60, 63, 66, 69, 72, 75, 90°, or a range including any of these endpoints. Inventive panels may have a smooth curve with practically any diameter, e.g., at least 40 50, 60, 75, 80, 90, 100, 110, 125, 150, 200, 250, 300, or 400 cm (measured from the center of the panel) and/or up to 10, 9, 8, 7, 6, 5, 4, 3.5, 3, 2.75, 2.5, 2.25, 2, 1.75, 1.5, 1.25, or 1 in. Cross-sections of the panels viewed from the plane of the floor (rather than the plane of the wall) may alternatively or also be ovular, sinusoidal, jagged/crinkle-cut, rounded square/rectangle, rounded or straight triangular (partial or full), rounded or straight pentagonal (partial or full), rounded or straight hexagonal (partial or full), rounded or straight octagonal (partial or full), etc. Such cross-sections may include 1, 2, 3, 4, 5, 6, or more of the aforementioned angles, or fractions thereof within any of range discussed above.

FIG. 2 show exemplary insulation material which is flexible in nature. FIGS. 3 to 8 show a stepwise manner of preparing an exemplary 35×35×20 cm wall panel including cement/concrete slabs 2 sandwiching a flexible PE foam insulation layer 1 with 5 orthogonally oriented (relative to the height, i.e., in thickness direction) rebar posts 4, prepared by pouring batchwise into a casting form 3.

FIGS. 9 and 10 show geometries of vertical load bearing elements with centrally placed PE flexible insulation 1 between cement elements 2. The regularly curved sample in FIG. 9 displays a radius 5 which may be, for example, 25, 30, 35, 40, 45, 50, 55, 60, 65, 70, 75, 80, 85, 90, 95, 100, 150, 200, 250, 300, 350, 400, 500 cm or more, based on an inner surface or center of the wall panel.

Although wall panels are only depicted as having two cement layers and one flexible layer, inventive panels may include 1, 2, 3, 4, 5 or more flexible layers and 2, 3, 4, 5, 6 or more cement layers. The flexible layer should each independently span 75, 80, 85, 90, 92.5, 95, 97.5, 98, 99, or 100% of a total area of the cement layers, and vice versa. The flexible layer thicknesses may independently be, for example, at least 5, 10, 12.5, 15, 17.5, 20, 22.5, 25, 27.5, 30, 32.5, 35, 37.5, 40, 42.5, 45, 47.5, 50, 52.5, or 55 cm and/or up to 75, 72.5, 70, 67.5, 65, 62,5, 60, 57.5, 55, 52.5, 50, 47.5, 45, 42.5, 40, 37.5, 35, 32.5, 30, 27.5, or 25 cm. The cement layer thicknesses may independently be, for example, at least 35, 37.5, 40, 42.5, 45, 47.5, 50, 52.5, 55, 57.5, 60, 62.5, 65. 67.5, 70, 72.5, 75, 77.5, 80, 82.5, 85, 87.5, 90, 92.5, 95 cm and/or up to 150, 145, 140, 135, 130, 125, 120 115, 110, 105, 100, 95, 90, 85, 80, 75, 70, 65, 60, 55, or 50 cm. The total thickness of inventive wall panels is not particularly limited but by practical considerations and may be, e.g., at least 10, 12.5, 15, 17.5, 20, 22.5, or 25 cm and/or up to 100, 80, 60, 50, 45, 40, 35, 30, 25, 20, or 15 cm.

Numerous modifications and variations of the pr sent invention are possible in light of the above teachings. It is therefore to be understood that within the scope of the appended claims, the invention may be practiced otherwise than as specifically described herein.

REFERENCE SIGNS

1 polymer/insulation layer
2 concrete
3 frame mold
4 orthogonal posts (e.g., rebar)
5 diameter

The invention claimed is:

1. A panel having a panel height, panel width, and panel thickness, the panel comprising:
   a first layer of solid Portland cement concrete;
   a layer consisting of flexible polymer foam, having a thickness of at least 5 cm;
   a second layer of solid Portland cement concrete; and
   a metal bar configured to extend between the first and second layers, through the layer consisting of flexible polymer foam, in an orientation substantially orthogonal to a surface defined by the panel height and the panel width;

wherein the layer consisting of flexible polymer foam is sandwiched between and in direct contact with the first and second layers and exposed at the edges of the panel, wherein the panel is suitable as a load-bearing element, and wherein the panel is suitable to be set in any of a planar, curved, and polyhedral cross-sectional shape.

2. The panel of claim 1, wherein the flexible polymer foam comprises a polymer selected from the group consisting of a polyolefin, a nitrite rubber, a polyester, a polyurethane (PU), a poly ethylene-vinyl alcohol (PEVA), a poly ethylene-vinyl acetate, and a polyvinyl alcohol.

3. The panel of claim 1, wherein the flexible polymer foam is a polyethylene foam.

4. The panel of claim 1, wherein the flexible polymer foam comprises a polymer selected from the group consisting of LDPE, HDPE, LLDPE, VLDPE, metallocene-catalyzed polyethylene, a polypropylene (PP), a PE-co-PP, and expanded PP.

5. The panel of claim 1, wherein the metal bar comprises steel.

6. The panel of claim 1, wherein the metal bar is rebar.

7. The panel of claim 1, wherein the panel comprises one metal bar per every 150 to 400 cm² of the panel.

8. The panel of claim 1, wherein the panel height is at least 35 cm and the panel width is at least 20 cm.

9. The panel of claim 1, wherein the panel thickness is at least 10 cm.

10. The panel of claim 1, wherein the layer of flexible polymer foam has a thickness in a range of from 10 cm to 50 cm, and wherein the first and second layers independently have a thickness in a range of from 50 to 100 mm.

11. The panel of claim 1, consisting of:

the first layer of solid Portland cement concrete;

the layer consisting of flexible polymer foam having a thickness of at least 5 cm;

the second layer of solid Portland cement concrete; and the metal bar configured to extend between the first and second layers, through the layer consisting of flexible polymer foam, in an orientation substantially orthogonal to a surface defined by the panel height and the panel width.

12. The panel of claim 1, having a cross-section orthogonal to its height axis including a curve and/or an angle of at least 15°.

13. The panel of claim 1, configured as a pipe or a half-pipe with an inner diameter in a range of from 25 to 200 cm.

14. A panel having a panel height, panel width, and panel thickness, the panel consisting of:

a first layer of solid Portland cement concrete;

a layer consisting of flexible polyethylene foam having a thickness of at least 5 cm;

a second layer of solid Portland cement concrete; and a rebar per every 150 to 400 cm² of the panel configured to extend between the first and second layers, through the layer consisting of flexible polyethylene foam, in an orientation substantially orthogonal to a surface defined by the panel height and the panel width;

wherein the layer consisting of flexible polyethylene foam is sandwiched between and in direct contact with the first and second layers and exposed at the edges of the panel, wherein the panel is suitable as a load-bearing element, and wherein the panel is suitable to be set in any of a planar, curved, and polyhedral cross-sectional shape.

15. The panel of claim 14, wherein each rebar extends through the outer surfaces of both the first and second layers, wherein the panel comprises no further metal bars traversing the insulation layer, heightwise, widthwise, thicknesswise, and diagonally, wherein the panel is configured as a pipe or a half-pipe with an inner diameter in a range of from 25 to 200 cm; and wherein the first and second layers have a thickness of from 75 to 92.5 mm and the layer consisting of flexible polyethylene foam has a thickness of from 15 to 20 mm.

* * * * *